Oct. 2, 1923.
G. J. FISCHER
1,469,435
EXPOSURE ATTACHMENT FOR CAMERAS
Filed Oct. 14, 1920
6 Sheets-Sheet 1

Inventor
George J. Fischer
By Attorney

Oct. 2, 1923.

G. J. FISCHER 1,469,435

EXPOSURE ATTACHMENT FOR CAMERAS

Filed Oct. 14, 1920    6 Sheets-Sheet 3

Inventor
George J. Fischer.
By Attorney

Oct. 2, 1923.  
G. J. FISCHER  
EXPOSURE ATTACHMENT FOR CAMERAS  
Filed Oct. 14, 1920   6 Sheets-Sheet 5

1,469,435

Inventor  
George J. Fischer.  
By Attorney

Oct. 2, 1923.

G. J. FISCHER 1,469,435

EXPOSURE ATTACHMENT FOR CAMERAS

Filed Oct. 14, 1920  6 Sheets-Sheet 6

Inventor
George J. Fischer
By Attorney

Patented Oct. 2, 1923.

1,469,435

UNITED STATES PATENT OFFICE.

GEORGE J. FISCHER, OF LONG ISLAND CITY, NEW YORK.

EXPOSURE ATTACHMENT FOR CAMERAS.

Application filed October 14, 1920. Serial No. 416,937.

*To all whom it may concern:*

Be it known that I, GEORGE J. FISCHER, citizen of the United States, and resident of Long Island City, in the county of Queens and State of New York, have invented certain new and useful Improvements in Exposure Attachments for Cameras, of which the following is a specification.

This invention relates to cameras and has for its object to provide an attachment for cameras, which may be attached to any camera wherein an automatic shutter control for instantaneous or time exposures is employed. More specifically the object of the invention is to control the shutter of the camera for instantaneous and time exposures and to release successively signalling means synchronously with the several successive operations of the shutter, preparatory to and during the taking of a picture, as may be predetermined by the operator and indicated on dials provided in the device, whereby the operator may know from the signals employed the length of time before the shutter opens, the instant when the shutter is opened, the duration of the exposure and the instant when the shutter is closed. A further object of the invention is to provide a device of the character described, in which a partial vacuum may be employed in conjunction with spring mechanism for operating the device. A further object is to provide means whereby the connection may be readily made with the antinous releasing means of the shutter, and a further object is to provide means which may be readily controlled for adjusting the parts of the device for regulating the action of the mechanism and a further object is to provide suitable air valves and inlets and means for controlling the same.

With these and other objects in view, reference may be had to the drawings, in which Fig. 9 is an irregular longitudinal sectional view, being one of the series of progressive views from 9 to 12 inclusive, showing the progressive stages or operation of the device while the picture is being taken; Fig. 9 also shows the shutter device of the camera and a fragmentary section of the antinous release connected therewith, disclosing the operation thereof and its connection with the attachment.

In the several views of the device in the drawings corresponding reference numerals relate to corresponding parts throughout the drawings; in which 10 indicates the casing, 11 a cylindrical chamber thereof, 12 a cylindrical member fitted within the chamber 11, being open at one end and closed at the other end. The cylindrical member 12 is provided with a threaded seat in an extension 13, in which the end of the rod 14 is disposed on which is supported a helically wound spring 15. Through the rod 14 near its threaded end is an air-passage 16 and communicating with the air-passage 16 is a conical valve seat and air-passage. The threaded chamber 13 of the cylindrical member 12 is further extended as at 18 and is provided with the threaded opening, in which a threaded screw valve 19 is disposed. The valve 19 is provided with a longitudinal groove 20, which serves as an air-passage for admitting air through the valve seat and air-passage 17 to the air-passage 16 of the rod 14. The flow of air through this valve may be regulated by rotating the screw valve 19 so as to admit more or less air through the conical valve seat and air-passage 17, so as to regulate the quantity of air to be admitted to a partial vacuum within the chamber. The tubular piston member 21 is provided to receive the impact or force exerted by the helical spring 15, which pushes the piston and connective parts forward when the mechanism is in operation. The piston 21 is provided with a head 22, which engages the interior peripheral surface of the tubular member 12 and packing means 23 is disposed around the head and retained in position by the circular plate 24 to prevent leakage of air from the chamber 25. Within the cylindrical member 12 on the forward end of the tubular piston 21 is a rotatable and longitudinal movable sleeve 26, having a circular head thereon 27. In the circular head 27 of the sleeve 26 is provided a recess 28 of larger diameter than that of the body of the sleeve and adapted to admit the head 29 of the screw 30, which is threaded into a threaded opening 21$^a$ in the forward end of the tubular piston 21. A flange 31 is provided on the head 29 of the screw 30 of a width corresponding with the depth of the recess 28 in the circular head 27 of the sleeve 26, thereby forming an annular chamber 32 within the circular head of the sleeve between the screw 30 and the head of the sleeve 27. A coil spring 33 is disposed within the chamber 32 and serves to normally retain the sleeve 26 in engagment with the seat or shoulder 21$^b$ of the tubular piston 21. Inclined shoulders 21$^c$ are provided on the seat 21$^b$ of the tubular piston 21 and corresponding recesses in the sleeve 26$^a$ of the sleeve 26 engage the shoulders 21$^b$ and serve to normally retain the sleeve 26 against rotation, relative to the tubular piston 21.

When it is desired to rotate the sleeve 26, however, the inclined shoulders 21$^c$ and 26$^a$ cooperate to enforce the sleeve 26 outwardly from the seat 21$^b$, so as to permit rotation of the sleeve. This longitudinal movement of the sleeve necessary to allow it to be forced from its seat so as to permit of rotation thereof is afforded by the compression of the spring 32 in the chamber 31.

Figures 13, 14, 15, 16, 17:
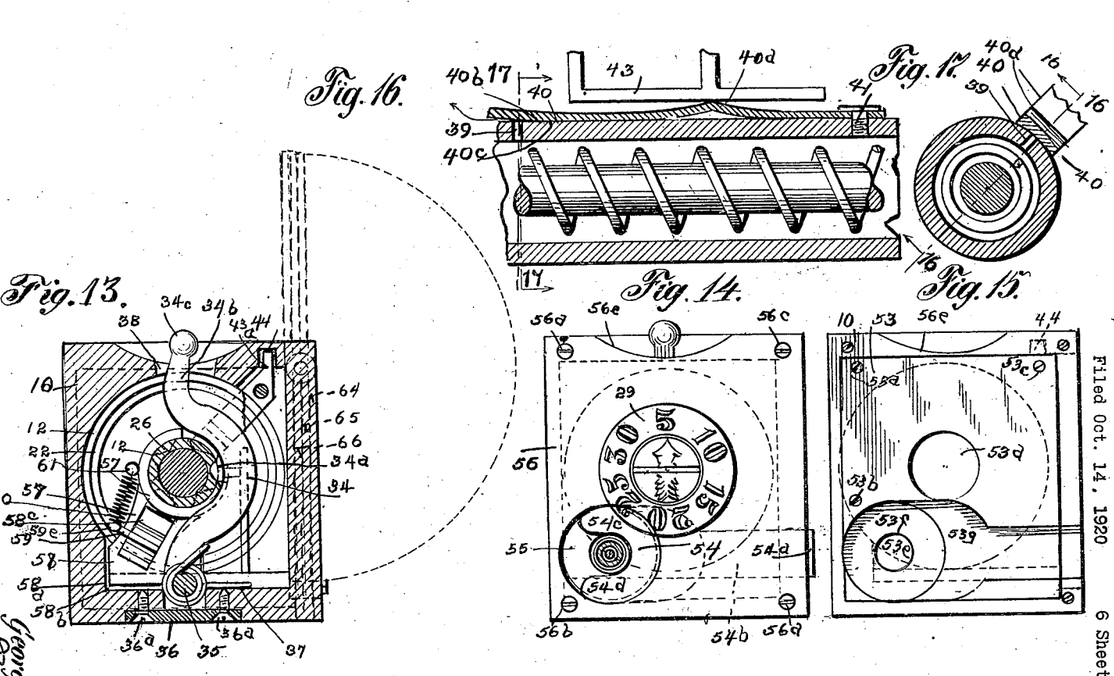
Fig. 13 is a transverse sectional view on the line 13—13 in Fig. 5.
Fig. 14 is a front elevation of the device.
Fig. 15 is a vertical sectional view on the line 15—15 of Fig. 1.
Fig. 16 is a fragmentary sectional view on the line 16—16 of Fig. 17.
Fig. 17 is a transverse sectional view on the line 17—17 of Fig. 16, showing the air valve and means for controlling the same.

The peripheral surface or circumference of the mating end of the sleeve 26 and the seat 21$^b$ are divided into six equal spaces and six corresponding inclined shoulders and recesses on the seat and in the sleeve are provided, whereby the sleeve may be rotated one-sixth of a revolution as two-sixths, three-sixths, four-sixths, five-sixths or a complete revolution and retained at any one of said positions. In like manner a series of recesses 26$^b$ are provided at spaced distances in the peripheral surface of the sleeve 26, one being disposed in a radial plane with each of the inclined recesses 21$^b$. These are arranged at spaced distances, however, longitudinally of the sleeve 26 and serve as a gauge for regulating the longitudinal thrust of the piston, whereby the thrust from the initial position may be regulated, thus lengthening or shortening the time, which it takes the piston to travel from its initial position to its final position for regulating the time of exposure or any interval of time contemplated in the operation of preparing for and taking the picture. It is designed that the screw head 29 will fit loosely within the chamber 28 of the circular head 27 of the sleeve 26 and that the screw 30 will be rigidly set or frictionally held in the end of the tubular piston 21$^a$, so that the circular head 27 and the sleeve 26 may be rotated while the screw 30 and the head 29 remain stationary. With this in view, reference may be had to Fig. 14, in which the face of the circular head 27 and the head 29 of the screw 30 are shown. As will be seen the face of the head is divided into six equal parts and numerals are indicated thereon, increasing from 5 to 30 in a ratio of 5 indicating intervals of time in seconds as 5 seconds, 10 seconds and upward to 30 seconds. On the surface of the screw head 29, an arrow is inscribed to indicate the position of the figure which is to be selected to determine the interval of time desired. Thus if five seconds is to be the desired interval, the dial of the head 27 is turned so that 5 is in the direction indicated by the arrow. However, if 30 seconds is the interval of time desired, 30 will be disposed in the direction indicated by the arrow and the sleeve 26 will then be disposed so that the recess requisite for regulating the interval of time desired, as indicated by the dial will be in proper position to meet the requirement condition, as follows:

A spring actuated lever 34 shown in Fig. 13 and other views of the drawings is supported upon a bearing 35. The bearing 35 is supported on a plate 36, which is secured in the bottom of the casing 10 by screws $36^a$ and a spring 37 is provided, which normally retains the lever 34 in engagement with the sleeve 26. The lever is formed so that its central portion conforms to the curvature of the sleeve 26 and a tooth or pawl $34^a$ engages within the recesses $26^b$ of the sleeve or any one of such recesses that may be disposed in a horizontal plane through the tubular piston 21 adjacent the lever. By forming the tooth with curved or inclined walls, it will be seen that when force is applied to the sleeve by gripping the circular head 27 thereof to rotate the same, it will tend to raise the tooth $34^a$ from its seat in any of the recesses $26^b$ or with the adjustment of the sleeve for regulating the interval of time, may be made without the necessity of manually gripping the lever to release the tooth $34^a$ from its seat in any of the recesses $26^b$. However, provision is made for manually releasing the lever by means of the extension $34^b$ thereof and the nib $34^c$, by which the lever may be moved from the sleeve 26, the slot 38 being provided to afford free movement of the lever. An air outlet 39 is provided in tubular piston 21 and a spring valve 40 is secured upon the piston by a screw 41. The spring valve 40 is normally elevated at the central portion $40^a$, so that when this point is slightly depressed the end $40^b$ thereof serves to close the air inlet 39, but when further depressed the spring valve at $40^c$ serves as a fulcrum to raise the end $40^b$ thereby the escape or leakage of the air through the inlet 39. The lug 42 is provided on the interior of the cylinder 12, which serves to depress the spring at $40^a$. When the piston has advanced during its operation, so as to bring the point $40^a$ under the lug 42 permitting a slight leakage of the air through the inlet 39 and permitting a more rapid movement of the piston in the forward direction. A cam 43 is disposed in a longitudinal plane with the end of the lug 42 at the arms $43^a$ and $43^b$. The upper end of the arms are disposed in a longitudinal groove or recess 44 in the casing 10 and are adapted to move longitudinally therein. Threaded bores are provided through the said arms $43^a$ and $43^b$ and a rod 45 is threaded through the said bores is rotatably held in bearings 46 and 47. A pinion 48 is keyed on the rod and meshes with the gear 49. A dial plate which serves also as a closure for the end of the device 50 has a central opening therethrough and a smaller opening at its upper left hand portion to engage the end of the rod 45, which projects therethrough when the plate is in position on the end of the device, where it is secured by screws $50^a$, $50^b$, $50^c$ and $50^d$, when hand nut 51 is disposed upon the end of the rod 45 and fixed with a set screw $51^a$, so that the rod may be rotated by the hand nut 51, so as to adjust the cam 43 longitudinally thereon, so that when the point $40^a$ of the spring 40 contacts with the cam 43, the position or point at which the contact will first take place may be varied by the adjustment of the cam 43 longitudinally of the device upon the threaded rod 45, so that the interval of time may be varied after the spring 40 has been actuated by the lug 42 and before contacting with the cam 43, which serves to continuously depress the spring and open the inlet 39 for admission of air until the exposure of the negative in the camera is finished. Thus hastening the forward movement of the piston during the interval of time when the spring 40 is depressed by the cam 43.

The gear 49 is journaled upon the extension 13 of the cylindrical member 12, so as to be rotatable thereon and the gear 49 has an extension $49^a$, which projects through the central opening of the dial plate 50. An indicator 52 is secured upon the extension $49^a$ of the cylindrical member 12, so as to be rotatable therewith and the central opening is provided through the indicator to admit the threaded screw valve 20 and is rotatable around said screw valve so that it may move correspondingly with the gear 49 when the gear is rotated by the rotation of the hand nut 51. The gear 49 is caused to rotate thereby rotating the indicator 52, causing it to move around in a circular direction over the dial plate 50. The dial may be integrally formed with the closure plate 50 or the dial may be inscribed upon a separate plate and superposed upon the closure plate 50. In either case the dial upon the dial plate is divided in an equally spaced advance and the main advances or spaces thereof are consecutively numbered with numbers increasing by a ratio of 5 from 0 to 60 indicating seconds of time and the subdivisions of the spaces indicate a lesser number of seconds or fractions of a second. When adjusting the attachment for regulating the interval of time desired between the time the spring is compressed by the plug 42 and when it is subsequently depressed by the cam 43, the hand nut 51 will be rotated until the indicator points to the numeral 5, 10 or 15 or the desired numeral indicating the seconds of time, which will indicate that when the indicator is so disposed it will take a number of seconds equal to the numeral to which the indicator points for the piston to travel a distance equal to the space between the plug 42 and the cam 43, when the cam is relatively adjusted upon the threaded rod 45 and when the indicator points to the number designated.

Thus the interval of time for such movement equal to the distance to the lug 42 and the cam 43 may be varied from a fraction of one second of a full minute or fraction thereof or a full minute and fraction thereof or longer. If more than one rotation is required to adjust the position of the cam of the machine, in such a case the indicator will register one minute plus 5, 10 or 15 seconds or a fractional part thereof as the indicator may indicate upon the dial.

A further feature of the device is means provided for actuating the release of the automatic shutter of the camera, as follows:

A plate 53 is seated within mortice provided in the front end of the casing 10 and therein secured by screws $53^a$, $53^b$ and $53^c$. This plate has a central opening $53^d$, through which the sleeve surrounding the piston 21 passes, so as to be freely rotatable therein and longitudinally movable therethrough without friction. An eccentrically disposed opening $53^e$ is also provided through the plate and the circular recess $53^f$ is provided concentrically with opening $53^e$ in the front surface from the outer surface of the plate 53 and a communicating recess $53^g$ of less depth than the recess $53^f$ is provided in the corresponding surface of the plate 53 and serves as a housing or bifurcated retaining member 54, having the arm $54^a$, the hand clip $54^b$ and the corresponding arms $54^c$ and $54^d$ which is slidably disposed therein. The retaining member 54 when in a position shown in Fig. 14 serves to retain a circular plate 55 of the antinous release within the recess $53^f$, but when it is withdrawn from that position into the recess $53^g$, the disk 55 of the antinous release may be removed from the recess $53^f$. A plate 56 with the central opening therethrough for the sleeve 26 and a concentrically disposed opening of a corresponding circular diameter with the circular recess $53^f$ of the plate 53, is disposed over the front end of the device covering the plate 53 and the recess $53^g$ and serving to retain the retaining member 54 in a housing or recess $53^g$, providing for three reciprocal sliding movements of the retaining member 54 in the housing or recess $53^g$, provided therefor, as required for retaining or releasing the disk 55 of the antinous release as hereinbefore described. The plate 56 is secured in position upon the end of the device by the screws $56^a$, $56^b$, $56^c$ and $56^d$, and is cut away at $56^e$, to provide for manipulating the nib $34^b$ of the lever 34. The antinous release shown in the drawings is of the type usually employed for actuating automatic camera shutters and comprises a disk 55 held by the retaining member 54, the sleeve $55^a$, a flange $55^b$ adjacent the sleeve 55 and the shaft $55^c$ to which is joined a flexible shaft $55^d$. The shaft $55^c$ projects beyond the disk 55 and terminates with the ball upon its end $55^e$ within the sleeve $55^a$ and surrounding the shaft $55^c$ is a helically wound spring which serves to force the shaft outwardly, relative to the sleeve $55^a$, but which yields under compression to admit to the movement of the shaft inwardly, relatively to the sleeve for actuating the antinous release of the camera shutter.

When the disk is disposed in the recess $53^e$ and retained by the retaining member 54, the sleeve $55^a$ is securely held in the position indicated in the drawings. Reference being particularly had to Figures 9, 10, 11 and 12. And the shaft $55^c$ normally extends inwardly to the position indicated in Fig. 9 and other views of the drawings.

Figure 4:
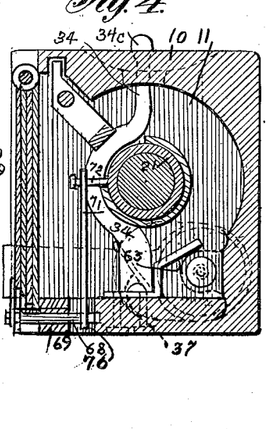
Fig. 4 is a vertical transverse sectional view on the line 4—4 of Fig. 3.
Figures 5, 6:
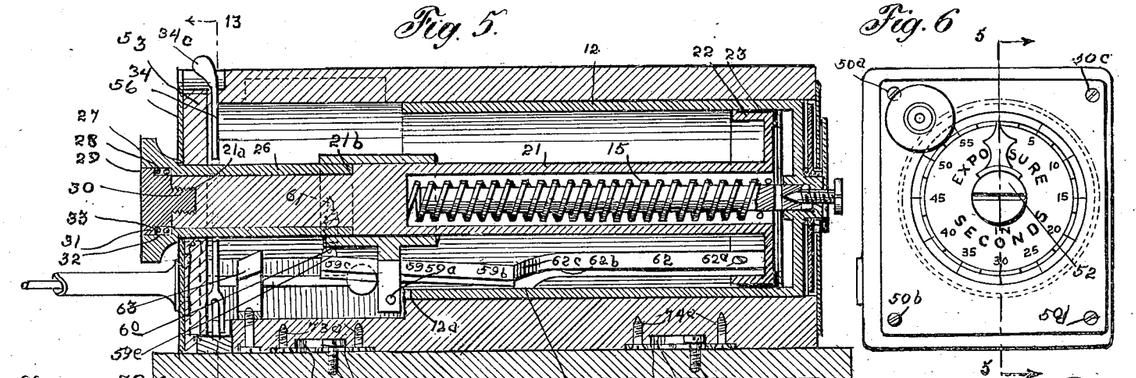
Fig. 5 is a longitudinal sectional view taken on the vertical plane of the line 5—5 of Fig. 6.
Fig. 6 is an end elevation of the device, showing the dial and indicator for regulating the time of exposure.
Figure 8:
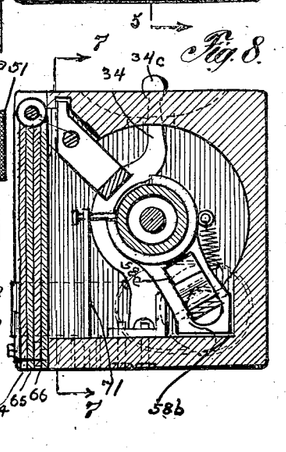
Fig. 8 is an irregular sectional view taken substantially on the line 8—8 of Fig. 7, looking toward the front of the device.
Figure 9:
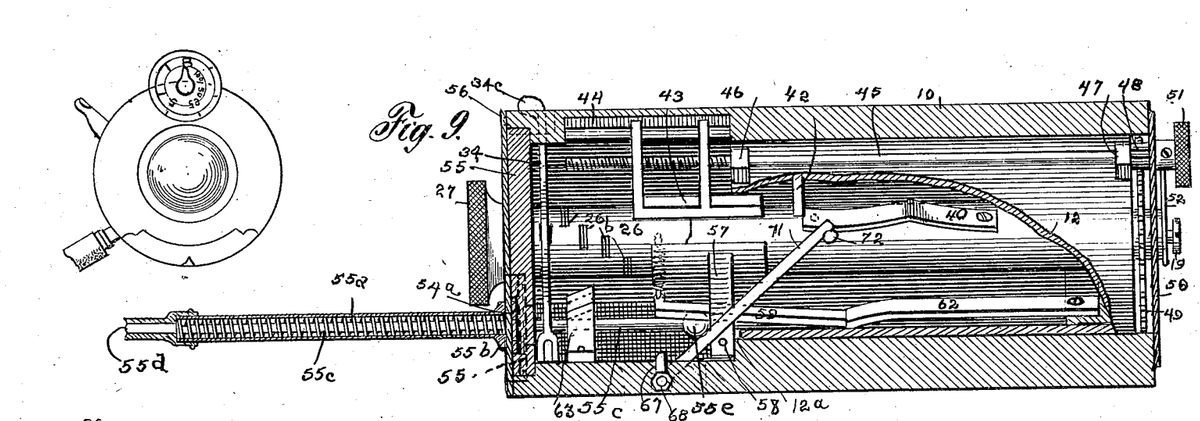
Figure 10:
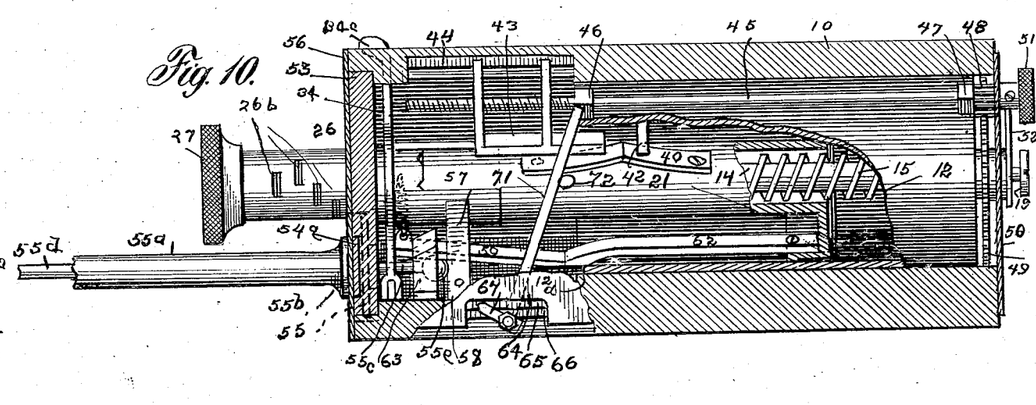
Fig. 10 is an irregular longitudinal sectional view, being one of the series of progressive views and showing the parts at the second stage in the operation thereof, while the picture is being taken.

The camera shutter is actuated by the movement of the shaft $55^c$ as controlled by the mechanism of my device, which is as follows:

A plunger 57 is slidably mounted upon the tubular piston 21 and as a nosing 58, which is normally disposed against a shoulder $58^a$ of the casing 10. The nosing 58 is slidably movable in a rectangular recess $58^b$ provided in the lower side portion of the casing. The mounting of the plunger consists of segmental portion of a cylinder of which substantially 90° thereof is cut away, as shown in Fig. 4 and Fig. 8 and other views of the drawings, so as to permit the plunger to move freely along the tubular piston past the spring valve 40 as hereinbefore described.

The nosing of the plunger has a recess therethrough as $58^c$ and in the aperture or recess $58^c$ a lever 59 is mounted on a pivotal bearing $59^a$. The lever has an arm $59^b$ extending rearwardly and an arm $59^c$ extending forwardly from the pivotal bearing and a spring 60 is connected to the lug $59^e$ of the lever 59 at one of its ends and the other end thereof is connected to a lug 61 on the plunger 58 and serves to yieldingly retain the forward end of the lever 59 in an upwardly inclined position so that the rearward end of the lever 59 is yieldingly held in a downward position, so as to contact with the inner peripheral surface of the cylindrical member 12, so as to be slidable thereon when the plunger is slidably moved upon the tubular piston 21. A spring member 62 is secured by a screw as $62^a$ to the flange 22 of the head of the piston at one of its ends and the other end extends toward the forward end of the device and normally rests against the inner peripheral surface of the cylindrical member 12 and adjacent the end $59^b$ of the lever 59. The member 62 is held normally in this position by spring pressure of the metal or material of which it is formed, which tends to force the forward end thereof downwardly. The forward end 62$^b$ is downwardly curved so as to present a cam surface on its upper side as at 62$^c$ and a plane surface on its lower side as 62$^d$, which contacts with the surface of the cylindrical member 12. A bearing surface is provided on the ends thereof for engaging the end of the arm 59$^b$ of the lever 59. The operation of these parts is as follows:

When the operator is ready to take the picture, the lever 34 is moved by means of a nib 34$^c$, so as to release the tooth or pall 34$^a$, from the recess of the sleeve 26, in which it may have been disposed preparatory to operation as 26$^c$. The tubular piston 21 is then forced forwardly within the cylindrical member 12 by means of the spring 15, carrying with it the member 62, which impinges against the end of the lever 59 and moves the plunger 58 forwardly at a corresponding speed with the piston. As the piston advances the end 59$^b$ of the lever 59 reaches the end of the cylindrical member 12 and drops into a recess 12$^a$, so that the upper surface thereof is flush with the inner surface of the cylindrical member 12 and the tension spring 60 exerted upon the forward arm 59$^c$ of the lever 59 tends to force the arm 59$^b$ of the lever downwardly into the said recess 12$^a$ and retain it in such position. When this has occured the plane end surface 62$^d$ of the end 62$^b$ of the member 62 glides smoothly and freely over the end 59$^b$ of the lever 59 and as the piston continues in its forward movement, the member slides along the upper surface of the lever 59 through the aperture or recess 58$^c$ of the plunger 58. If the forward end 62$^b$ of the member 62 is passed through the said aperture 58$^c$, then the force of the spring in the member 62 will bear upon the forward arm 59$^c$ of the lever 59 and depress it so as to relatively elevate the rearward arm 59$^b$ thereof and raise it out of the recess 12$^a$ and bring it upward into contact with the end surface of the spring member 62. To be certain that the arm 59$^b$ of the lever 59 is thus released from the recess 12$^a$ on its juncture in the operation and in case the tension of the spring 60, which tends to retain the arm 59$^b$ of the lever 59 in said recess 12$^a$, should be great enough to overcome the force of the spring member 62, to lower the arm 59$^c$ and release the end of the arm 59$^b$ from said recess, I have provided a cam actuating member 63, which is secured in the bottom of the casing by screw 63$^a$, which will engage the cam surface 62$^c$ of the spring member 62 and as the spring member 62 is further carried forward by the piston 15, the cam 62$^c$ will engage the under surface of the cam actuating member 63 and be forced downwardly against the arm 59$^c$ of the lever 59, thereby insuring the release of the arm 59$^b$ of the lever 59, so that the lever 59 will assume the position hereinbefore described, engaging against the end surface of the spring member 62, whereby the plunger 58 is released and free to move in a rearward direction.

Figure 11:
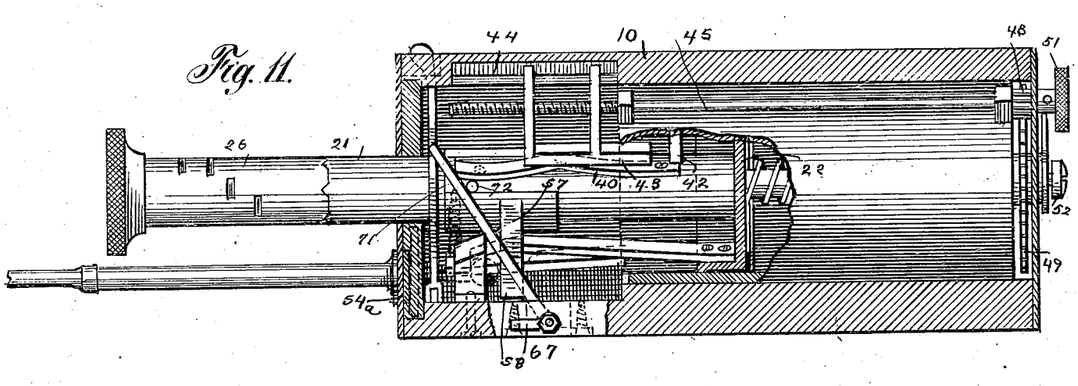
Fig. 11 is an irregular longitudinal sectional view, being one of the series of progressive views, showing the parts of the device at the third stage of operation, while a picture is being taken.
Figure 12:
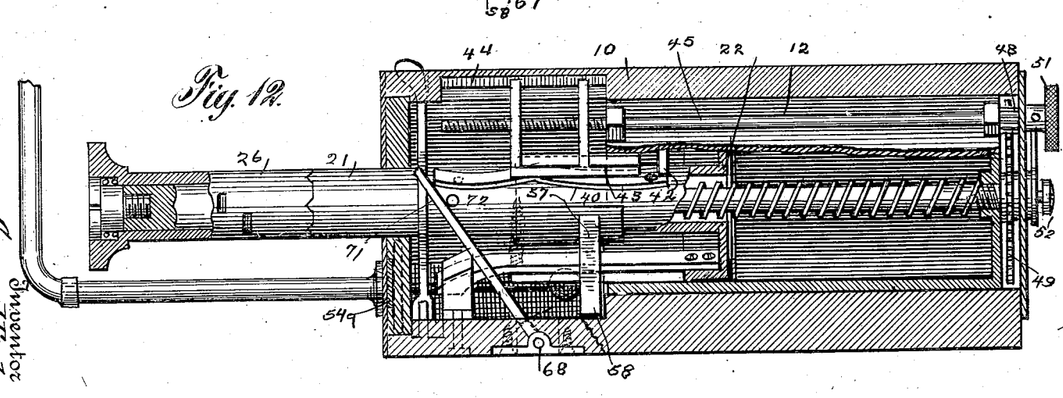
Fig. 12 is an irregular longitudinal sectional view, showing the parts of the device at the fourth stage of operation, while the picture is being taken.

While the plunger 58 was moving forward with the piston and in contact with the ball 55$^e$ of the shaft 55$^c$, the spring 55$^c$ in the sleeve 55$^a$ was under compression and the flexible shaft 55$^d$ was moved forward in the flexible tube 55$^f$, as required for actuating the automatic shutter of the camera, but when the shutter has been opened, it is necessary that the compression be relaxed and the movement of the shaft reversed by the air pressure of the automatic shutter, so that the shutter may be closed. In order to permit the free movement of the shaft in the reverse direction, the force applied against the ball 55$^b$ of the shaft 55$^c$ must be removed so that the spring 55$^c$ may carry the shaft 55$^b$ in a reverse direction or outwardly relative to the sleeve 55$^a$ for releasing the shutter so that it may be automatically closed. When the lever 59 has been disposed in the position described, as shown in Fig. 11, then the action of the spring 55$^c$ upon the shaft 55$^b$ to enforce the ball 55$^e$ against the plunger 58 and carry it rearwardly so as to dispose the lever 59 telescopically underneath the spring member 62, which operation is illustrated in Figures 11 and 12, so that the plunger may be returned to the normal position, where it rests against the shoulder 58 of the casing and the shaft 59$^b$ of the antinous release is reflexibly moved, so as to release the shutter mechanism and permit the closing of the shutter.

Figure 1:
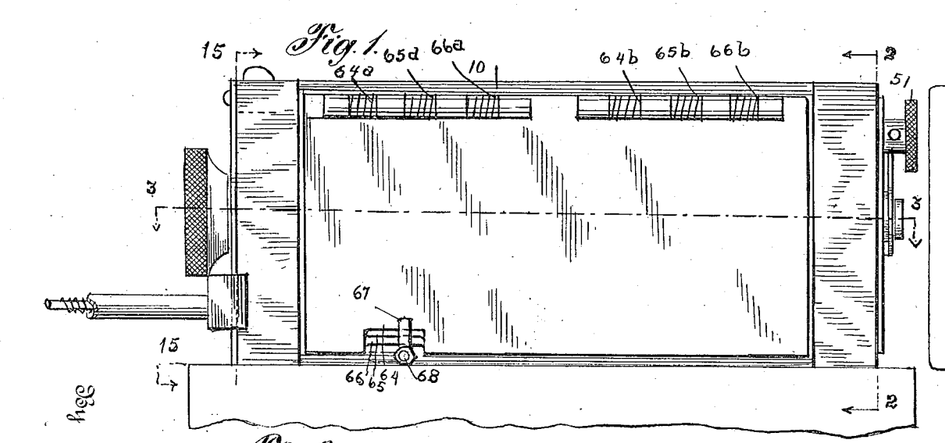
Figure 1 is the side elevation of the attachment showing it in connection with a camera, the body of which is broken away and showing the antinous release as connected therewith
Figure 2:
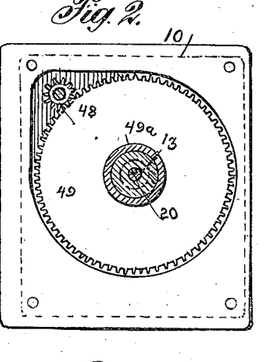
Fig. 2 is a transverse vertical section on the line 2—2 of Fig. 1, showing the means for setting the indicator for indicating the time of exposure in seconds on a dial.
Figure 3:
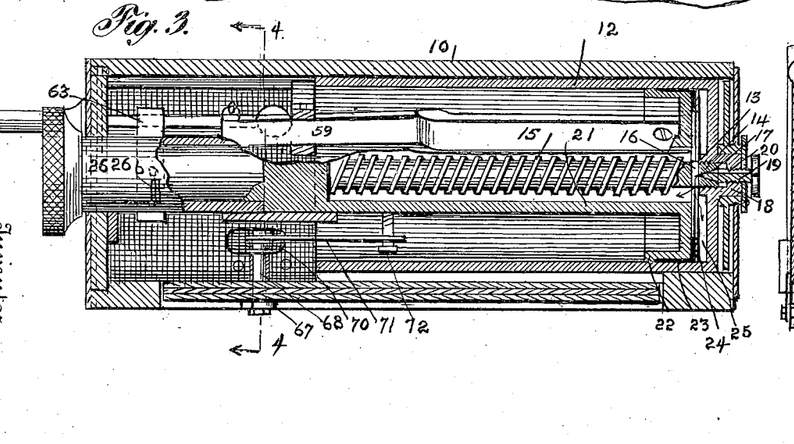
Fig. 3 is a sectional plan of the device on the line 3—3 of Fig. 1.
Figure 7:
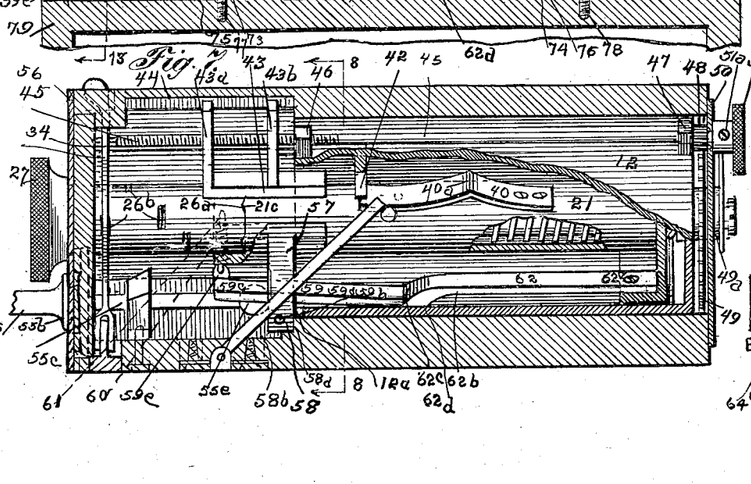
Fig. 7 is an irregular longitudinal sectional view taken substantially on the line 7—7 of Fig. 8, showing the mechanism set in readiness for taking a picture.
Figure 18:
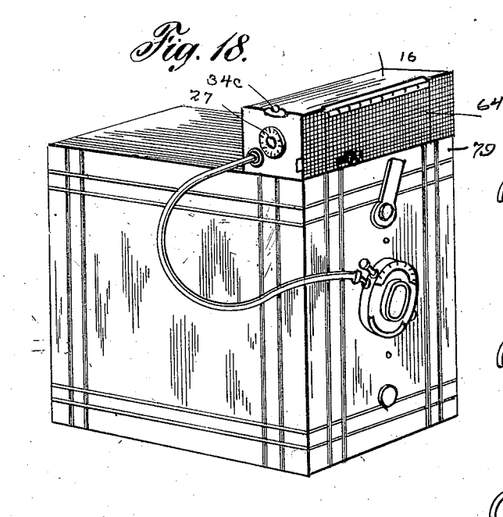
Fig. 18 is a perspective view of a small camera, equipped with my attachment and connected with the antinous release of the automatic shutter, showing the signalling mechanism in the normal position and presenting a black exterior surface to the eye on the face thereof, corresponding with the front of the camera.
Figures 19, 20, 21:
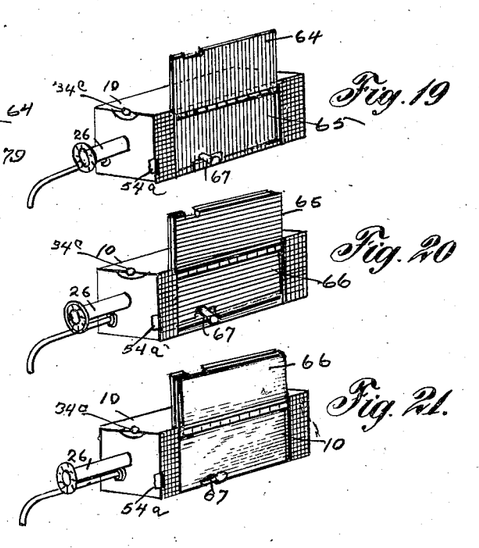
Fig. 19 is a miniature perspective view showing the signal device as it appears at the second stage of the operation, while a picture is being taken.
Fig. 20 is a perspective view showing the signalling device as it appears at the third stage of operation, while a picture is being taken
Fig. 21 is a view showing the signalling device as it appears at the fourth stage of operation, while the picture is being taken or when the operation has been completed.

The signal means employed in the device comprises a plurality of folded or hinged members. The hinged members 64, 65 and 66, which are normally disposed in overlapping relation against one side of the attachment and secured in this position by means of a retaining member 67, which is rigidly held upon the shaft 68. The shaft 68 is mounted in a bearing 69 secured in a recess provided in the bottom part of the casing. A passage 70 is provided in the bottom of the casing into which the end of the shaft 68 extends. A lever 71 is keyed upon the end of the shaft 70 and is movable in an arc of substantially 90° from the initial or first position, shown in Figures 7 and 9 to the second, third and fourth or final position, shown in Figures 10, 11 and 12. The pin 72 is disposed in the tubular piston 21 and serves to actuate the lever 71, so as to carry it forward with the movement of the piston. As the lever is moved forward the retaining member 67 is inclined from the vertical or initial position, shown in Fig. 1 and when the lever assumes the position shown in Fig. 10, the retaining member 67 is sufficiently inclined to release the folding member 64, which is immediately swung upwardly in an arc or semi-circular path to the position shown in Fig. 19 of the drawings, as the lever is further advanced toward the position shown in Fig. 11. The folding member 65 is released and thrown upwardly to the position shown in Fig. 20 and when the lever has reached its last or final stage, shown in Fig. 12, the folding member 66 is released and thrown in the position upwardly shown in Fig. 1 of the drawings. The signalling means is arranged to employ colors for signalling, for example, when the folding members 64, 65 and 66 are in their normal position, as shown in Fig. 1 and Fig. 18, the outer surface thereof is back, as shown in Fig. 18. The folding member 64 being nearest to the eye is colored black, corresponding with the color of the exterior of the device. The opposite surface of this folding member 64 is colored red and the exterior surface of the next succeeding folding member 65 is also colored red, so that when the member 64 is disposed in the position shown in Fig. 19 a red signal equal to a size equal to twice the extent of one of said folding members is preesnted to the eye, thereby rendering the signal clearly visible at a considerable distance. The inside of the folding member 65 is colored blue and the outside surface of the member 66 is also colored blue, so that when the member 65 is elevated to the position shown in Fig. 20, a blue signal of a size equal to twice the extent of one of said folding members is presented to the eye and at the inside of the folding member 66 and the inside of the folding member 66 and the surface of the camera casing against which the member 66 is disposed within the normal position, is white so that when the member 66 is elevated to the position shown in Fig. 21, the white signal of a size equal to twice the extent of one of the folding members, is visible to the eye. A different code of color signals may be employed, if desired, without departing from the spirit or scope of this invention.

To retain the device upon a camera, I have provided slotted plates 73 and 74, which are held in position by screws 73$^a$ and 74$^a$, seated in the bottom of the casing 10. Recesses 75 and 76 are provided in the bottom of the casing, for which the plates 73 and 74 are disposed posts or screws 77 and 78 are disposed in the frame of a camera 79, so that the heads thereof project a slight distance above the surface of the camera frame, so that the heads may engage within the slotted opening of the plates 73 and 74 held above the recesses 75 and 76 in the bottom of the casing 10. The slotted plates 73 and 74 have a larger opening 73$^b$ and 74$^b$ at one end thereof, adapted to admit the heads of the screws 78 and 79, but the remaining portion of the slotted opening is of a width substantially the same as the diameter of the shank of the screws, so that when the head of the screws are disposed through the circular openings at one end of the slotted plates, the attachment can be moved so as to direct the screws into the narrower portion of the slotted openings, so as to engage the head of the screws and thus serve to retain the attachment in the fixed position upon the camera. The form of the retaining means for holding the attachment upon the camera may be greatly varied so that the parts may be frictionally engaged or held by spring means or any desired means may be employed for removably retaining the attachment upon the frame of a camera.

When the device is to be used in taking a picture, the piston 21 is compressed within the casing to substantially a position, shown in Figs. 1, 3, 5, 7 and 9, but it is not necessary to depress the piston to the extreme position shown in said figures, since it may be desired to regulate the initial position of the piston by means of the adjusting lever 34 and the sleeve 26 having the recess therein 26$^c$, in which case the tooth or pawl 34$^a$ of the lever 34 is disposed within either of said recesses 36$^c$, that may be deemed preferable for regulating the time of the first interval of the operation of taking the picture, that is the time elapsing between the setting of the device before the signal is given for the exposure so that if a brief interval is desired, one of the recesses more remote from the head 29 of the sleeve is employed for engaging the pawl 34$^a$ of the lever 34 and the result will be, as follows:

The lug 42 is at a fixed position on the interior of the cylindrical member 12 and the shoulder 40$^a$ on the spring 40, is at a fixed position longitudinally of the cylindrical tube 21, so that with given spring pressure and a given leakage of air into the piston chamber, if the piston were always set at the extreme position farthest within the casing, as shown in Figures 1, 3, 5, 7 and 9, the time or interval between the release of the device, by disengaging the pawl 34$^a$ of the lever 34 from the recess 26$^c$ to the time when the shoulder 40$^a$ would come in contact with the lug 42, would always be the same, but if the head 27 is so adjusted that the pawl 34$^a$ of the lever 34 will engage the second, third, fourth or fifth or sixth of the recesses 26$^c$, then the interval of time passing from the releasing of the lever to the time when the shoulder 40$^a$ engages the lug 42 will be proportionately reduced.

Thus it will be seen how the first interval of time may be regulated by setting the head 27 of the sleeve 26, so as to engage the desired recess of the sleeve. In order to make the variations of the time of this interval correspond in seconds of time with the numbers inscribed on the face of the head 27, it will be only necessary to regulate the air valve 20 by rotating the screw 19, so as to afford a sufficient amount of air to regulate the travel of the piston 21, by force of the spring 15, so that the time of travel from the first position would be equal to 30 seconds, and the last position 5 seconds. Then the time it would require for the piston to travel from the second, third, fourth or fifth position, would correspond in seconds of time with the number denoted upon the dial surface 29 of the head 27. It has hereinbefore been fully described how the dial 50, the indicator 52, the cam 43, the threaded rod 45 and the hand nut 51 and the gear 49 cooperate with the tubular piston 12 and spring 15 and other features of the device for regulating the second interval in the operation of the device or the time after the second signal is given and before the shutter of the camera is opened for the exposure of the negative by positioning the cam 43 upon the threaded rod 45, so as to increase or decrease the length of time after the shoulder 40ª has been disengaged by the lug 42, before the shoulder 40ª engages the cam 43. It will be seen that when the proper adjustment of the air valve 19 has been attained so as to regulate the movement of the piston 21, so that the time required for the movement thereof will correspond in seconds with the numbers inscribed upon the dial surface 29 of the piston head 27. The adjustment of the cam 43 upon the rod 45 can then be regulated in such a manner that with the rotation of the thumb nut 51 and the indicator 52, the interval of time required for the passage of the piston during the second interval or from the time the shoulder 40ª is disengaged from the lug 42 to the time when it is engaged by the cam 43, will also be so regulated that the indicator will point to a number on the dial corresponding with the time in seconds of such interval.

Finally, the operation of the device is as follows:

The dials being set and the device being so adjusted as to operate in the time indicated by the dials, then the lever 34 is brought into engagement with the recess 26ᶜ of the sleeve 26. The camera is placed at a desired position and the lever 34 is then released from engagement with the recess of the sleeve 26. The piston 21 under pressure of the spring 15 begins to move forward, the operator immediately takes a predetermined position in the picture during the first interval. Having taken his position during the first interval, the device gives the first signal by releasing the first folding member 64 and displaying the red signal thereof. This will indicate that immediately or within one, two or three seconds, for example. the shutter of the camera will open for the exposure. The next interval will be the exposure of the negative and during this time the second folding member 65 will be elevated and the blue signal visible to the eye. When the exposure has been completed, the third signal will be given, that is the folding member 66 will be raised and a white signal visible to the eye indicating that the exposure of the negative is completed and the shutter of the camera closed.

While I have limited the description of my invention in the foregoing specification quite closely to the construction of the device shown in the drawings, I do not wish to be understood to be limited thereby, but reserve the right to depart therefrom within the reasonable spirit and scope of this invention, realizing that the device may be constructed in many various forms with the same mechanical result and without departing from the object and scope of my invention.

Having thus described my invention, what I claim as new thereof and desire to secure by Letters Patent of the United States, is:

1. In a device of the character described, means for controlling a camera shutter comprising a casing having a cylindrical chamber, a cylindrical element fitted within said casing, and being open at one end and closed at the other, and a reciprocating piston within said cylindrical element, valve-means for admitting air to said cylindrical element and piston, and valve-means operable by the plunger element for releasing air.

2. In a device of the character described, means for controlling a camera shutter comprising a casing having a cylindrical chamber, a cylindrical element fitted within said casing and being open at one end and closed at the other, and a reciprocating manually rotatable and spring-actuated piston within said cylindrical element, adjustable valve-means for admitting air to said cylindrical element and piston, and spring-actuated valve-means operable by the plunger-element for releasing air.

3. In a device of the character described, means for controlling a camera shutter comprising a casing having a cylindrical chamber, a cylindrical element fitted within said casing and being open at one end and closed at the other, and a reciprocating and rotatable manually operable and spring-actuated piston within said cylindrical element, adjustable valve-means for admitting air to said cylindrical element and piston, and a normally closed spring-valve for alternatively confining air within said piston and permitting escape of air therefrom, and means operable by the plunger element for instantaneously opening said spring-valve, and means for subsequently maintaining said valve open.

4. In a device of the character described, means for controlling a camera shutter comprising a casing having a cylindrical chamber, a cylindrical element fitted within said chamber and being open at one end and closed at the other end, and a reciprocating and rotatable manually operable and spring-actuated piston within said cylindrical element, adjustable valve-means for admitting air to said cylindrical element and piston, and a normally closed spring-valve for alternatively confining air within said piston and permitting escape of air therefrom, and means operable by the plunger-element for instantaneously opening said spring-valve, and means for subsequently maintaining said valve open, and means for gauging the movements of the piston.

5. In a device of the character described, means for controlling a camera shutter comprising a casing having a cylindrical chamber, a cylindrical element fitted within said chamber and being open at one end and closed at the other end, and a reciprocating and rotatable manually operable and spring-actuated piston within said cylindrical element, and spring-actuated means for selectively limiting the movements of the piston, and indicator means for gauging said movements, combined with the antinous releasing means of a camera shutter and signal means for indicating the operations, substantially as shown and described.

Signed at the city of New York, State of New York, this 3d day of Oct., A. D. 1920.

GEORGE J. FISCHER.